United States Patent
Minixhofer et al.

(10) Patent No.: US 10,001,102 B2
(45) Date of Patent: Jun. 19, 2018

(54) GAS VALVE

(71) Applicant: Robert Bosch GmbH, Stuttgart (DE)

(72) Inventors: Claus Minixhofer, Feldkirchen (AT); Roland Mitter, Gramastetten (AT); Martin Hainberger, Linz (AT)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 14/861,494

(22) Filed: Sep. 22, 2015

(65) Prior Publication Data

US 2016/0084211 A1    Mar. 24, 2016

(30) Foreign Application Priority Data

Sep. 22, 2014 (DE) .................. 10 2014 219 019

(51) Int. Cl.

| | |
|---|---|
| *F16K 31/06* | (2006.01) |
| *F02M 21/02* | (2006.01) |
| *F02M 35/10* | (2006.01) |
| *F02M 63/00* | (2006.01) |
| *F16K 3/02* | (2006.01) |
| *F16K 47/04* | (2006.01) |

(52) U.S. Cl.
CPC .... *F02M 63/0031* (2013.01); *F02M 21/0239* (2013.01); *F02M 35/10216* (2013.01); *F02M 35/10255* (2013.01); *F02M 63/0077* (2013.01); *F16K 3/0218* (2013.01); *F16K 31/0689* (2013.01); *F16K 47/04* (2013.01); *Y02T 10/32* (2013.01)

(58) Field of Classification Search
CPC .... F16K 31/0689; F16K 47/04; F16K 3/0218; F02M 63/0031; F02M 35/10255; F02M 21/0239; F02M 35/10216; F02M 63/0077; Y02T 10/32
USPC .................................................. 251/64, 333
See application file for complete search history.

(56) References Cited

U.S. PATENT DOCUMENTS

| | | | | |
|---|---|---|---|---|
| 3,556,464 | A | * | 1/1971 | Griswold .............. F16K 31/402 251/120 |
| 4,531,541 | A | * | 7/1985 | Hartshorn ........... F04B 39/1033 137/514 |
| 5,427,352 | A | * | 6/1995 | Brehm ................ F15B 13/0405 188/268 |
| 5,813,654 | A | * | 9/1998 | Hopley ................ F02M 59/466 251/129.02 |
| 2003/0062492 | A1 | * | 4/2003 | Haeberer ............. F02M 47/027 251/64 |

(Continued)

FOREIGN PATENT DOCUMENTS

DE    102009002836    11/2010

*Primary Examiner* — Marina Tietjen
(74) *Attorney, Agent, or Firm* — Michael Best & Friedrich LLP

(57) ABSTRACT

A gas valve 1, in particular a dosing valve for a gaseous medium, having a valve seat body 3, which is arranged on a valve housing 2, and a closing body 7, which can perform a stroke motion relative to the valve seat body 3 and to an opening stroke stop 17 interacting with the valve housing 2. According to the invention, a gas valve 1 is provided which is improved as regards its durability. This is achieved by virtue of the fact that the gas valve 1 has an impact body which reduces the impact speed and/or impact energy of the closing body 7 on the valve seat body 3 and/or on the opening stroke stop 17.

19 Claims, 4 Drawing Sheets

(56) References Cited

U.S. PATENT DOCUMENTS

2008/0142091 A1\* 6/2008 Meinig .................... F16K 7/17
                                                    137/488
2008/0230733 A1\* 9/2008 Spiegl ................ F04B 39/1053
                                                    251/333

\* cited by examiner

GAS VALVE

BACKGROUND OF THE INVENTION

The invention relates to a gas valve, in particular a dosing valve for a gaseous medium, having a valve seat body, which is arranged on a valve housing, and a closing body, which can perform a stroke motion relative to the valve seat body and to an opening stroke stop interacting with the valve housing.

A gas valve of this kind is known from DE 10 2009 002 836 A1. This gas valve is a dosing valve for a gaseous medium, which has a valve chamber arranged in a valve housing and having at least two chamber openings, of which a first chamber opening is surrounded in an annular manner by a valve seat, and a closing body, which is arranged in the valve chamber and on which a sealing seat that can be placed on the valve seat and raised from the valve seat is formed. The sealing seat is in the form of a knife edge and thereby ensures leaktight seating upon initial commissioning of the gas valve by means of a sealing impact into the closing body. However, the disadvantage is that the sealing seat in the form of a knife edge can wear relatively quickly owing to the knife-edge design and, as a result, malfunctions in the gas valve thus formed can occur.

Moreover, the prior art includes gas valves, the sealing seat of which is designed as a flat seat. In the case of a flat seat, the sealing effect is achieved by means of the very flat surface. However, this flat contact surface is also worn through the action of impacts during operation.

SUMMARY OF THE INVENTION

It is the underlying object of the invention to provide a gas valve which is improved as regards its durability.

This object is achieved by virtue of the fact that the gas valve has a damping impact body which reduces the impact speed and/or impact energy of the closing body on the valve seat body and/or on the opening stroke stop. This embodiment is based on the realization that, at the sensitive sealing surface of the valve seat body, the closing body in current gas valves impacts directly on the seat thus formed, without being braked. Complex measures, e.g. special pairs of materials, coatings or a reduction in the mass of the closing body, are necessary to control any possible wear on this sealing surface. During the opening process, the closing body strikes the opening stroke stop in the same way. To maintain a constant stroke and hence a constant opening cross section in relation to the valve seat body over the service life of the gas valve, wear likewise needs to be avoided at this point as well. By virtue of the fact that, according to the invention, an impact body which reduces both the closing speed and the opening speed of the closing body, for example, is provided, any wear that occurs over the service life of the gas valve is prevented or at least significantly reduced in these sensitive regions, thus increasing the durability of the correspondingly designed gas valve.

As a development of the invention, the impact body is an annular body surrounding the valve seat body and/or the opening stroke stop. However, it is also possible for the impact body to be formed by a plurality of blocks arranged on the circumference of the valve seat body. On the one hand, an impact body of this kind designed as an annular body or as blocks, for example, can be manufactured without problems and can furthermore be integrated without problems into an existing gas valve. At the same time, it is furthermore possible for the material of the impact body to be chosen in such a way in relation to the closing body that the impact body can undergo a calculable wear over the service life of the gas valve, without this wear impairing the operation of the gas valve designed in this way, however. Consequently, the impact body functions as a "sacrificial mass" over the service life of the gas valve, while the sealing surface between the closing body and the valve seat body and between the closing body and the opening stroke stop is not prejudiced during this time. This ensures that the operating behavior of the gas valve designed in this way is more or less unchanged over its entire service life.

In another embodiment of the invention, the impact body is a cylinder or, alternatively, a block arranged centrally in the valve seat body. This embodiment is suitable as a replacement for a corresponding impact body, in the form of an annular body or block for example, arranged on the valve body side but can also be present in addition to such an annular body. If both the annular body, for example, and the central cylinder are present, it is possible to significantly increase the impact area of the closing body and hence to further increase durability. As an alternative, however, the damping rate or the kinetic energy remaining in the closing body after the impact processes can be influenced thereby.

In another embodiment of the invention, the impact body can be moved during interaction with the closing body, in particular in relation to the valve housing. The travel is dimensioned in such a way that the impact of the closing body, especially on the valve seat body, takes place in such a way that no wear can occur between these components. Fundamentally, quasi-static spring forces of the impact body (bodies) or the storage thereof in the form of potential energy do not play a role. They merely serve to return the impact body (bodies). The effect achieved according to the invention is based on the dynamic impact process and the resulting transfer of at least part of the kinetic energy of the closing body to the impact body. In the case of closure, this furthermore takes place on an area outside the sealing region between the closing body and the valve seat body, this area being insignificant for the sealing function of the gas valve.

In a development of the invention, the closing body can be moved against the force of at least one spring device. The spring device can consist of a number of individual springs, for example, or can be a single spring. In particular, the spring device brings about return of the impact body to its initial position after the closing body has been moved away from the impact body again during a subsequent switching operation.

As a development of the invention, the impact body itself is elastically deformable. This elastic deformability of the impact body can be provided by an appropriate choice of material. By means of this embodiment too, the speed of impact of the closing body on the valve seat body, in particular, is reduced.

In a development of the invention, the maximum opening stroke of the closing body relative to the valve seat body is greater than the maximum stroke of the closing body relative to the impact body. This embodiment ensures that the closing movement of the closing body is braked only shortly before or immediately before impact on the valve seat body. This ensures that the closing time of the gas valve designed in this way is not changed or not substantially changed, in particular lengthened, as compared with a gas valve without an impact body according to the invention. At the same time, it is possible under some circumstances for a possible lengthening of the closing time to be balanced out by a higher initial closing speed of the closing body. The same applies in reverse to the opening stroke of the closing body.

In another embodiment of the invention, the impact body includes an alignment function for the closing body relative to the valve seat body. It is thereby possible to compensate for a slight slope in the position of the closing body before impact of the closing body on the valve seat body and thus to ensure more accurate closure of the gas valve.

As a development of the invention, the gas valve is a gas inlet valve of an internal combustion engine, the gas inlet valve being used to allow a combustion gas into an intake device, an intake port or directly into a combustion chamber of the internal combustion engine.

BRIEF DESCRIPTION OF THE DRAWINGS

Further advantageous embodiments of the invention can be found in the description of the drawing, in which illustrative embodiments shown in the figures are described in detail.

In the drawing.

DETAILED DESCRIPTION

Figure 1:
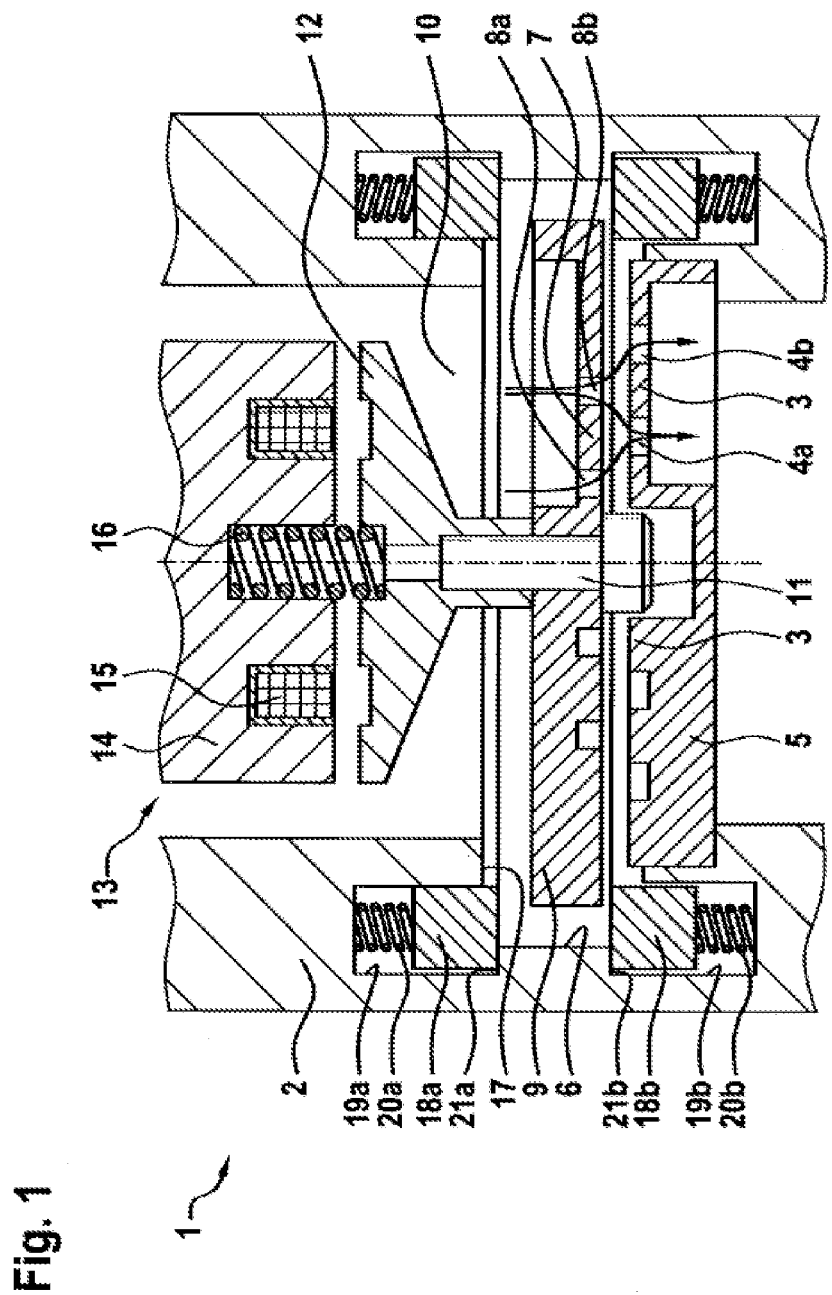
FIG. 1 shows a longitudinal section through a gas valve designed in accordance with the invention.

The gas valve 1 shown in FIG. 1 is designed as a gas inlet valve, by means of which a gaseous fuel is fed directly or indirectly to a combustion chamber of an internal combustion engine. In this case, the gas valve can be installed on an intake section of the internal combustion engine and can inject the gaseous fuel centrally into the intake section. However, it is also possible for the gas valve 1 to be installed in an intake branch of the intake section, wherein the intake branch is the intake duct leading to an inlet valve directly adjoining a combustion chamber of the internal combustion engine. In the context of the invention, it is furthermore also possible for the gas valve 1 to be installed in a cylinder head of the internal combustion engine and to be in direct contact on the outlet side with the combustion chamber, bypassing the intake section and the intake duct. By means of the gas valve 1, gaseous fuel is introduced into the combustion chamber, is burnt there with combustion air supplied and performs work on a crankshaft of the internal combustion engine.

The gas valve has a valve housing 2, in which a valve seat body 3, which is in the form of a circular ring for example, is arranged and fastened in a suitable manner. In the case of an annular embodiment, the valve seat body 3 is inserted into a corresponding annular aperture in the valve housing 2, for example. The valve seat body 3 has a number of outlet passages 4a, 4b of fundamentally arbitrary design, being in the form of circular rings in the illustrative embodiment. To reinforce the valve seat body 3, radially arranged valve seat body ribs 5 are arranged on the circumference of the valve seat body 3. A closing body 7 is arranged in a recess 6 in the valve housing 2, said recess being designed as a guide if appropriate, in a manner which allows axial movement relative to the valve seat body 3. Like the valve seat body 3, the closing body 7 is provided with passages 8a, 8b, which are arranged offset relative to the outlet passages 4a, 4b and are, for example, likewise annular, wherein the closing body 7 likewise has radially arranged closing body ribs 9. In the illustrated open position of the closing body 7 relative to the valve seat body 3, a gas fed to a valve chamber 10 flows through the passages 8a, 8b and the outlet passages 4a, 4b—as illustrated on the right-hand side of the figure—out of the gas valve 1 and onward directly or indirectly into the combustion chamber of the internal combustion engine.

The closing body is connected to an armature 12 of an electromagnet 13 by means of a fastening bolt 11. The electromagnet 13 is fastened firmly in the valve housing 2 and has a magnet body 14, in which a coil 15 and a compression spring 16 are arranged. When the coil 15 is energized, a magnetic field is built up, moving the armature 12 together with the closing body 7 into one open position. In the drawing, a central position of the closing body 7 between the open position and a closed position is shown. If the energization of the coil 15 is discontinued, the compression spring 16 pushes the armature 12 and thus the closing body 7 downward until the closing body 7 makes contact with the valve seat body 3. Owing to the offset between passages 8a, 8b and the outlet passages 4a, 4b, the gas flow through the gas valve 1 is ended.

In order to reduce the impact speed and/or impact energy of the closing body 7 on the valve seat body 3 and, during an opening movement, on an opening stroke stop 17 formed in the valve housing 2, two impact bodies are provided in the illustrative embodiment shown, these being designed as annular bodies 18a, 18b and being arranged in annular-body recesses 19a, 19b in the valve housing 2. In the illustrated position of the closing body 7, the annular bodies 18a, 18b are pushed against stops 21a, 21b in the annular-body recesses by annular-body springs 20a, 20b, said stops projecting relative to the opening stroke stop 17 and the valve seat body 3 to such an extent that the closing body 7 strikes annular body 18a first during an opening movement and strikes annular body 18b first during a closing movement. If there is a further opening movement or closing movement, the closing body 7 comes into contact with the opening stroke stop 17, displacing annular body 18a in annular-body recess 19a, or comes into contact with the valve seat body 3, displacing annular body 18b in annular-body recess 19b Annular-body springs 20a, 20b interacting with the annular bodies 18a, 18b serve only to return the two impact bodies to the respective initial position after an impact has occurred. The spring force is as low as possible in order to avoid generating an increase in the necessary magnetic force in the open valve state or to avoid generating an increase in the spring force of the compression spring 16 required to keep the valve closed. The reduction in the impact speed is accomplished through the dynamic transfer of momentum to the impact body but not through the spring forces of the annular-body springs 20a, 20b. Wear on the gas valve 1 caused by a conventional impact of the closing body 7 on the valve seat body 3 or opening stroke stop 17 is thereby avoided.

Figure 2:
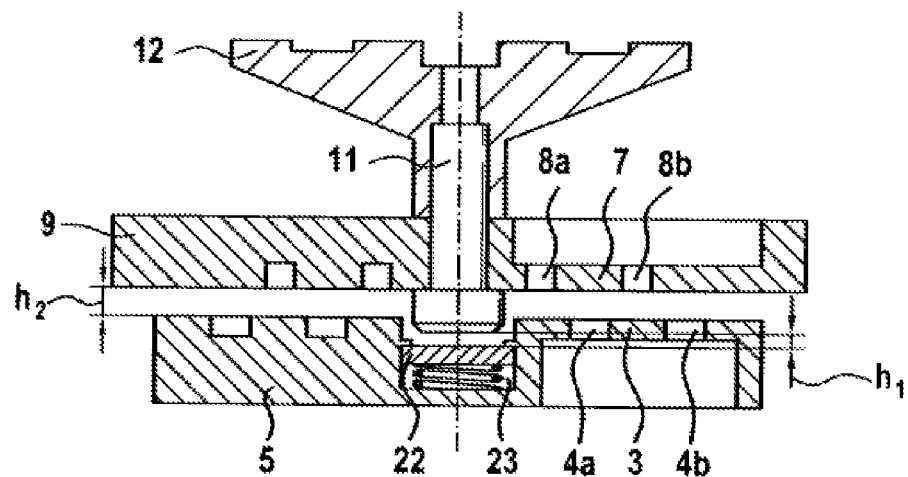
FIG. 2 shows a partial longitudinal section through a variant of a gas valve.

In an alternative embodiment to annular body 18b, which reduces the closing speed of the closing body 7 relative to the valve seat body 3, the gas valve 1 according to FIG. 2 has an impact body which is arranged in the valve seat body 3, is designed as a cylinder 22 and can be moved against the force of one or more cylinder springs 23. To provide the intended function, $h_1<h_2$. The impact body designed as a cylinder 22 can be installed instead of annular body 18b or in addition to annular body 18b and can be combined with annular body 18a.

Figure 3:
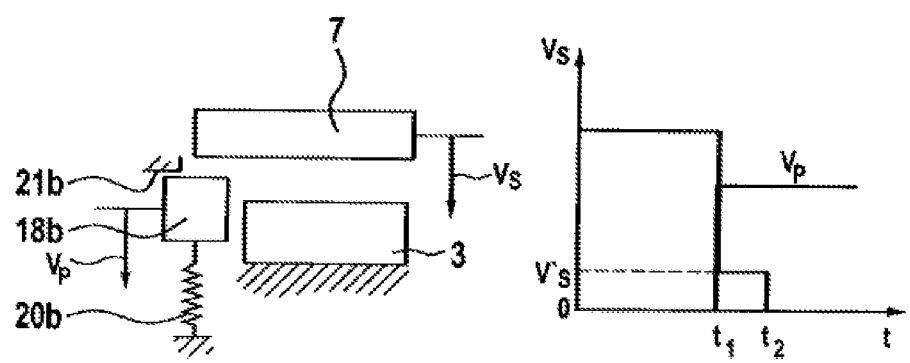
FIG. 3 shows an illustration of the reduction in speed of a closing body of the gas valve designed in accordance with the invention.

The schematic diagram according to FIG. 3 shows a relationship between an actuating speed $v_S$ of the closing body 7 and a speed of movement $v_P$ of the impact body, whatever the design thereof, up to the point of impact on the valve seat body 3. Initially, the closing body 7 is moved at a high actuating speed $v_S$ by the force of the compression spring 16 until the closing body 7 strikes the impact body, in this case annular body 18b, at time $t_1$. At time $t_1$, some of the momentum is transferred from the closing body 7 to annular body 18b through the impact process, depending on the ratio of masses and the coefficient of restitution. The closing body 7 then moves at the reduced actuating speed $v'_S$ toward the valve seat body 3 until, at time $t_2$, it comes to rest on the valve seat body 3 and then has the speed 0.

Figure 4:
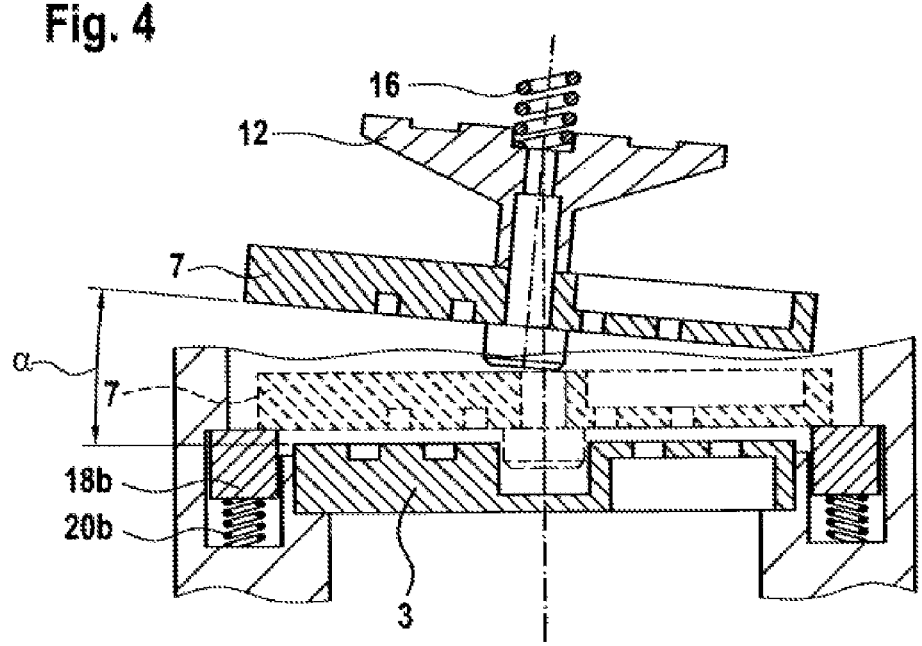
FIG. 4 shows a schematic representation of an alignment function for a closing body performed by an impact body of the gas valve.

FIG. 4 shows a closing body 7 sloping relative to the valve seat body 3. This slope by an angle $\alpha$, which can be caused by the compression spring 16, for example, is absorbed when the closing body 7 strikes annular body 18b, and the closing body 7 is aligned parallel to the valve seat body 3 shortly before it strikes the latter, as indicated in broken lines.

Figure 5A:
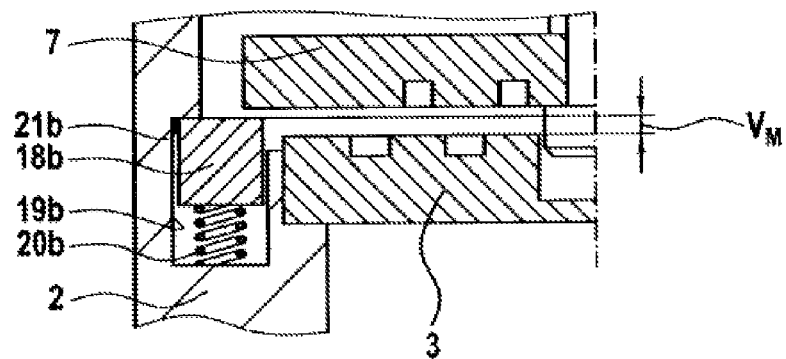
FIGS. 5a, 5b show a schematic representation of a wearing function of an impact body according to the invention.
Figure 5B:
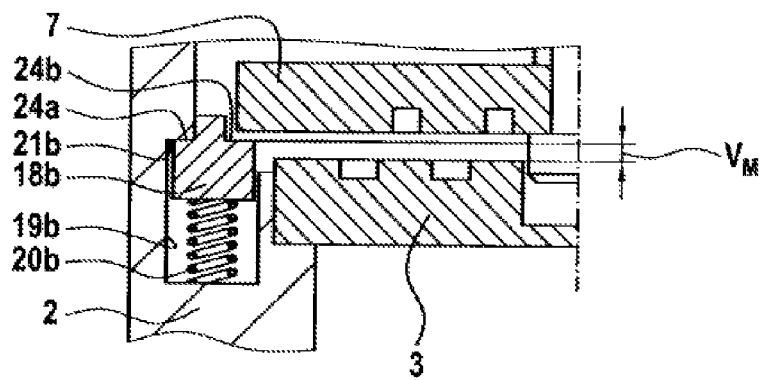

FIGS. 5a, 5b show annular body 18b in the new state (FIG. 5a) and in a worn state (FIG. 5b). The worn state is reached at the end of the predetermined service life of the gas valve 1 and ensures wear-free movement of the closing body 7 relative to the valve seat body 3 or the opening stroke stop 17 up to this time. When the worn position is reached, annular body 18b has been worn down on both sides in relation to stop 21b in the annular-body recess and relative to the closing body 7 to such an extent that offsets 24a, 24b caused by wear result. These offsets 24a, 24b caused by wear can arise from abrasion of the material of annular body 18b, which is manufactured from a less resistant material, in relation to the valve housing 2 and the closing body 7. Owing to the fact that the offsets 24a, 24b caused by wear have the same extent, i.e. the same depth, as the height of the closing body 7 in the new state, the extent of projection $V_M$ remains virtually the same from the new state to the worn state.

Figure 6:
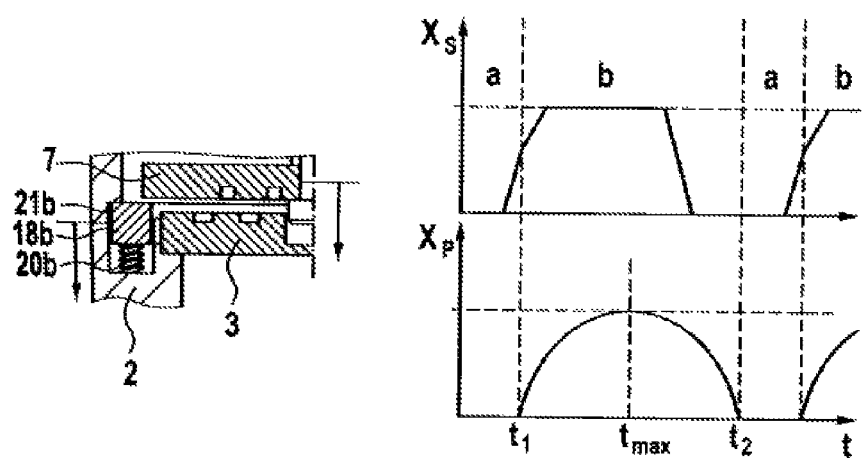
FIG. 6 shows an illustration in diagrammatic form of a transfer of momentum to an impact body during a closing process of a closing body.

A time/displacement diagram for the closing body 7 is given in the upper diagram in FIG. 6. After initiation of a closing movement $x_S$ by discontinuation of the energization of the coil 15, the closing body 7 is moved ultimately from its open position a into the closed position b, wherein it strikes annular body 18b at time $t_1$ (see lower diagram). The further closing movement takes place at a slower speed, this being indicated by a reduction in the gradient. At time $t_1$, there is a transfer of momentum to the impact body mass—this being illustrated in the lower diagram—said transfer undergoing a maximum backswing $x_P$ up to time $t_{max}$. At time $t_2$ of the return of the impact body mass, the closing body 7 is already back in the open position and is not affected by the impact body mass springing back.

What is claimed is:

1. A gas valve (1) comprising:
   a valve housing (2) including a valve seat body (3), which defines a valve seat, and also includes an opening stroke stop (17);
   a closing body (7) configured to perform a closing stroke motion relative to the valve seat body (3) between the opening stroke stop (17) and the valve seat; and
   an impact body that reduces the impact speed and/or impact energy of the closing body (7) on the valve seat body (3) when the closing body (7) impacts the impact body,
   wherein the impact body is arranged in the center in the valve seat body (3),
   wherein the majority of the closing stroke motion of the closing body (7) occurs before the closing body (7) impacts the impact body such that the closing body (7) impacts the impact body shortly or immediately before the closing body (7) impacts the valve seat body (3), and
   wherein the impact body is configured to be moved during interaction with the closing body (7), braking the movement of the closing body (7).

2. The gas valve (1) according to claim 1, characterized in that the impact body is a cylinder (22) arranged in the center in the valve seat body (3).

3. The gas valve (1) according to claim 2, wherein the impact body (22) is a first impact body, and wherein the gas valve (1) further includes a second impact body (18b) that is an annular body and that further reduces the impact speed and/or impact energy of the closing body (7) on the valve seat body (3).

4. The gas valve (1) according to claim 3, wherein the second impact body (18b) surrounds the valve seat body (3).

5. The gas valve (1) according to claim 2, wherein the gas valve (1) further comprises a fastening bolt (11) which fastens the closing body (7) to an armature (12), and wherein the cylinder (22) reduces the impact speed and/or impact energy of the closing body (7) on the valve seat (3) by engaging the fastening bolt (11).

6. The gas valve (1) according to claim 1, characterized in that the impact body is elastically deformable.

7. The gas valve (1) according to claim 1, characterized in that a maximum opening stroke of the closing body (7) relative to the valve seat body (3) is greater than a maximum stroke of the closing body (7) relative to the impact body.

8. The gas valve (1) according to claim 1, characterized in that a maximum opening stroke of the closing body (7) relative to the opening stroke stop (17) is greater than a maximum stroke of the closing body (7) relative to the impact body.

9. The gas valve (1) according to claim 1, characterized in that the gas valve (1) is a gas inlet valve of an internal combustion engine.

10. The gas valve (1) according to claim 1, wherein the closing body (7) is configured to perform an opening stroke motion relative to the valve seat body (3) between valve seat and the opening stroke stop (17), wherein the impact body (22) is a first impact body, wherein the gas valve (1) further includes a second impact body (18a) that reduces the impact speed and/or impact energy of the closing body (7) on the opening stroke stop (17) when the closing body (7) impacts the second impact body (18a), and wherein the majority of the opening stroke motion of the closing body (7) occurs before the closing body (7) impacts the second impact body (18a) such that the closing body (7) impacts the second impact body shortly or immediately before the closing body (7) impacts the opening stroke stop (17).

11. The gas valve (1) according to claim 1, characterized in that the gas valve (1) is a dosing valve for a gaseous medium.

12. A gas valve (1) comprising:
   a valve housing (2) including a valve seat body (3), which defines a valve seat, and also includes an opening stroke stop (17);

a closing body (7) configured to perform a closing stroke motion relative to the valve seat body (3) between the opening stroke stop (17) and the valve seat; and an impact body that reduces the impact speed and/or impact energy of the closing body (7) on the valve seat body (3) when the closing body (7) impacts the impact body, wherein the impact body is arranged in the center in the valve seat body (3), wherein the majority of the closing stroke motion of the closing body (7) occurs before the closing body (7) impacts the impact body such that the closing body (7) impacts the impact body shortly or immediately before the closing body (7) impacts the valve seat body (3), and wherein the impact body is elastically deformable.

13. A gas valve (1) comprising:

a valve housing (2) including a valve seat body (3), which defines a valve seat, and also includes an opening stroke stop (17);

a closing body (7) configured to perform a closing stroke motion relative to the valve seat body (3) between the opening stroke stop (17) and the valve seat; and an impact body that reduces the impact speed and/or impact energy of the closing body (7) on the valve seat body (3) when the closing body (7) impacts the impact body, wherein the impact body is arranged in the center in the valve seat body (3), wherein the majority of the closing stroke motion of the closing body (7) occurs before the closing body (7) impacts the impact body such that the closing body (7) impacts the impact body shortly or immediately before the closing body (7) impacts the valve seat body (3), and wherein the closing body (7) is configured to perform an opening stroke motion relative to the valve seat body (3) between valve seat and the opening stroke stop (17), wherein the impact body (22) is a first impact body, wherein the gas valve (1) further includes a second impact body (18a) that reduces the impact speed and/or impact energy of the closing body (7) on the opening stroke stop (17) when the closing body (7) impacts the second impact body (18a), and wherein the majority of the opening stroke motion of the closing body (7) occurs before the closing body (7) impacts the second impact body (18a) such that the closing body (7) impacts the second impact body shortly or immediately before the closing body (7) impacts the opening stroke stop (17).

14. The gas valve according to claim 13, wherein the second impact body is an annular body (18a).

15. The gas valve according to claim 14, wherein the second impact body (18a) surrounds the opening stroke stop (17).

16. The gas valve (1) according to claim 15, wherein the gas valve (1) further includes a third impact body (18b) that is an annular body and that further reduces the impact speed and/or impact energy of the closing body (7) on the valve seat body (3) when the closing body (7) impacts the third impact body (18b).

17. The gas valve (1) according to claim 13, wherein the second impact body includes an alignment function for the closing body (7) relative to the valve seat body (3).

18. The gas valve (1) according to claim 13, wherein the gas valve (1) further includes a third impact body (18b) that is an annular body and that further reduces the impact speed and/or impact energy of the closing body (7) on the valve seat body (3) when the closing body (7) impacts the third impact body (18b).

19. The gas valve (1) according to claim 18, wherein the third impact body (18b) surrounds the valve seat body (3) and includes an alignment function for the closing body (7) relative to the valve seat body (3).

* * * * *